(12) United States Patent
Rusakov

(10) Patent No.: US 8,677,492 B2
(45) Date of Patent: Mar. 18, 2014

(54) DETECTION OF HIDDEN OBJECTS IN A COMPUTER SYSTEM

(75) Inventor: Vyacheslav E. Rusakov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 235 days.

(21) Appl. No.: 12/955,279

(22) Filed: Nov. 29, 2010

(65) Prior Publication Data

US 2011/0289600 A1 Nov. 24, 2011

(30) Foreign Application Priority Data

May 18, 2010 (RU) ................................ 2010119564

(51) Int. Cl.
*G06F 21/22* (2006.01)
*G06F 21/00* (2013.01)
*G06F 7/04* (2006.01)

(52) U.S. Cl.
USPC ................... 726/24; 726/22; 726/23; 726/26; 726/27; 726/30

(58) Field of Classification Search
USPC ..................... 726/30, 22–24, 26–27
See application file for complete search history.

(56) References Cited

U.S. PATENT DOCUMENTS

| | | | |
|---|---|---|---|
| 7,007,025 B1 | 2/2006 | Nason et al. | |
| 7,512,810 B1 * | 3/2009 | Ryan ............................ | 713/189 |
| 7,571,482 B2 | 8/2009 | Polyakov et al. | |
| 7,587,724 B2 | 9/2009 | Yeap | |
| 7,757,290 B2 | 7/2010 | Costea et al. | |
| 2005/0229250 A1 | 10/2005 | Ring et al. | |
| 2007/0055711 A1 * | 3/2007 | Polyakov et al. ............. | 707/203 |
| 2007/0078915 A1 | 4/2007 | Gassoway | |
| 2007/0107052 A1 * | 5/2007 | Cangini et al. .................. | 726/22 |
| 2007/0169192 A1 * | 7/2007 | Main et al. ....................... | 726/22 |
| 2007/0300061 A1 | 12/2007 | Kim et al. | |
| 2008/0127344 A1 | 5/2008 | Sallam | |

FOREIGN PATENT DOCUMENTS

| | | |
|---|---|---|
| WO | WO0067109 | 11/2000 |
| WO | WO02101526 | 12/2002 |
| WO | WO2004019162 | 3/2004 |
| WO | WO2007044498 | 4/2007 |
| WO | WO2007090224 | 8/2007 |

OTHER PUBLICATIONS

European Office Action for European Application No. 10188163.9 dated Mar. 20, 2012.

(Continued)

*Primary Examiner* — Beemnet Dada
*Assistant Examiner* — Kalish Bell
(74) *Attorney, Agent, or Firm* — Patterson Thuente Pedersen, PA

(57) ABSTRACT

System and method for detecting a security compromise of a service module of an operating system running on a computer. At least one native service module returns a first set of requested information relating to at least one object in the computer system in response to a request made by at least one process or thread. A secondary service module generates and returns a second set of requested information relating to the at least one object in the computer system in response to a request made by at least one authorized process or thread, bypassing the at least one native service module. Access of threads is limited to the secondary service module such that only predetermined threads generated by a trusted security application are permitted to access the secondary service module.

19 Claims, 7 Drawing Sheets

(56) References Cited

OTHER PUBLICATIONS

European Office Action for European Application No. 10188163.9 dated Jul. 31, 2012.

Xuan et al., "Shepherding Loadable Kernel Modules through On-demand Emulation", Georgia Institute of Technology. Jul. 9, 2009.

Xuan et al., "Toward Revealing Kernel Malware Behavior in Virtual Execution Environments", Aug. 2009.

Tsaur et al., "Exploring Rootkit Detectors' Vulnerabilities Using a New Windows Hidden Driver Based Rootkit", Department of Information Management, Da-Yeh University, Changhua, Taiwan, R.O.C. Aug. 2010.

Free Online Dictionary and Thesaurus. Defining the word: Bypass. http://www.freedictionary.com/bypass Jan. 3, 2013.

Amendment and Remarks by Applicant in Counterpart European Application No. 10188163.9-2212 dated Jan. 11, 2013.

* cited by examiner

DETECTION OF HIDDEN OBJECTS IN A COMPUTER SYSTEM

FOREIGN PRIORITY

This application claims the benefit of Russian Federation Patent Application No. 2010119564 filed May 18, 2010, and entitled "System for Detection of Hidden System Resources."

FIELD OF THE INVENTION

The invention relates generally to security in data processing systems and, more particularly, to determining the presence of hidden objects in such systems, which in turn may be used to detect the presence of malware such as malicious rootkits.

BACKGROUND OF THE INVENTION

Presently, computer users throughout the world are plagued by a widespread problem of malware, which affects not only computers running MS Windows versions, but also other less popular platforms. Malware is becoming increasingly more sophisticated, forcing producers of anti-malware software to continually find new approaches for detecting and removing malware programs.

Besides conventional methods of detection, such as digital signature checking, and utilizing emulator programs, other technologies being used include systems for intrusion detection or intrusion prevention that control programs and maintain whitelists of trusted applications.

Of particular concern are malware programs, known as rootkits, which, to date, have not been effectively manageable using conventional security measures. These programs are able to conceal tracks of their existence in computer systems using techniques such as hijacking administrator (or higher-level) privileges. Such programs are difficult to detect using known antivirus techniques because known techniques have limited ability to see objects that are hidden, such as hidden files, hidden processes, or hidden registry entries, for example.

To conceal their existence, rootkits utilize various methods of intercepting system functions, such as intercepting, i.e., hooking, and changing the information to be returned in response to program function calls. For example, a rootkit may detect a program function call that requests certain registry entries and, instead of returning those actual registry entries, the rootkit returns a modified or reduced list of registry entries to the calling program.

It should be noted that, besides the traditional notions of rootkits being malware, some may be used for legitimate applications, such as copy protection techniques. Known methods of detecting rootkits involves creating specific procedures corresponding to individual rootkits (such that operation of the rootkit could be bypassed, or to interfere with the system function intercepts that the rootkit uses). These methods present an intensive burden for security program developers, who struggle with keeping up with the ever-expanding advance of malware.

Another approach, such as the one disclosed in U.S. Pat. App. Pub. No. 2007/0078915 (Gassoway) involves running a separate detector in kernel space that bypasses some of the operating system's kernel code that may have been compromised by a rootkit. If information about the computer system is requested through both, the compromised kernel code, as well as through the separate detector, any differences between the separate results may indicate a rootkit's presence. This approach provides a means for detecting rootkit without a priori knowledge of specific existing rootkits; however, the separate detector itself may be compromised by rootkit-like malware targeting the specific security technique.

In addition, it is contemplated that in the near future, rootkits or rootkit-like malware may target other parts of a computer system that are not equipped to detect such malware.

Accordingly, improved techniques for effective rootkit detection that overcome these, and other, challenges is needed.

SUMMARY OF THE INVENTION

One aspect of the invention is directed to a computer system for detecting objects that may be hidden therein. The computer system has computer circuitry with at least a processor coupled to a memory arrangement, the computer circuitry being configured to execute at least an operating system and a security arrangement. The operating system is adapted to facilitate execution of a plurality of processes and provide at least one native service module that returns a first set of requested information relating to at least one object in the computer system in response to a request made by at least one of the plurality of processes.

The security arrangement includes a secondary service module that is adapted to generate and return a second set of requested information relating to the at least one object in the computer system in response to a request made by at least one authorized process of the plurality of processes. In generating the second set of requested information, the secondary service module bypasses the at least one native service module. Further, the security arrangement includes an access limiting module that limits access to the secondary service module such that only the at least one authorized process is permitted to access the secondary service module.

Additionally, the security arrangement includes a comparison module hat is adapted to compare the first set of requested information and the second set of requested information and, based on the comparison, determines whether any object is present in the second set of requested information that is absent from the first set of requested information.

Another aspect of the invention is directed to a method for detecting a security compromise of a service module of an operating system running on a computer system. According to the method, at least one native service module returns a first set of requested information relating to at least one object in the computer system in response to a request made by at least one thread.

A secondary service module generates and returns a second set of requested information relating to the at least one object in the computer system in response to a request made by at least one authorized thread. In generating the second set of requested information, the secondary service module bypasses the at least one native service module. Access of threads is limited to the secondary service module such that only predetermined threads generated by a trusted security application are permitted to access the secondary service module.

The first set of requested information and the second set of requested information are compared and, based on the comparison, it is determined whether any object is present in the second set of requested information that is absent from the first set of requested information, thereby identifying at least one hidden object. The hidden object can be analyzed to determine whether the native service module has been compromised.

A number of advantages of these, and other, aspects of the invention will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

Figure 1:
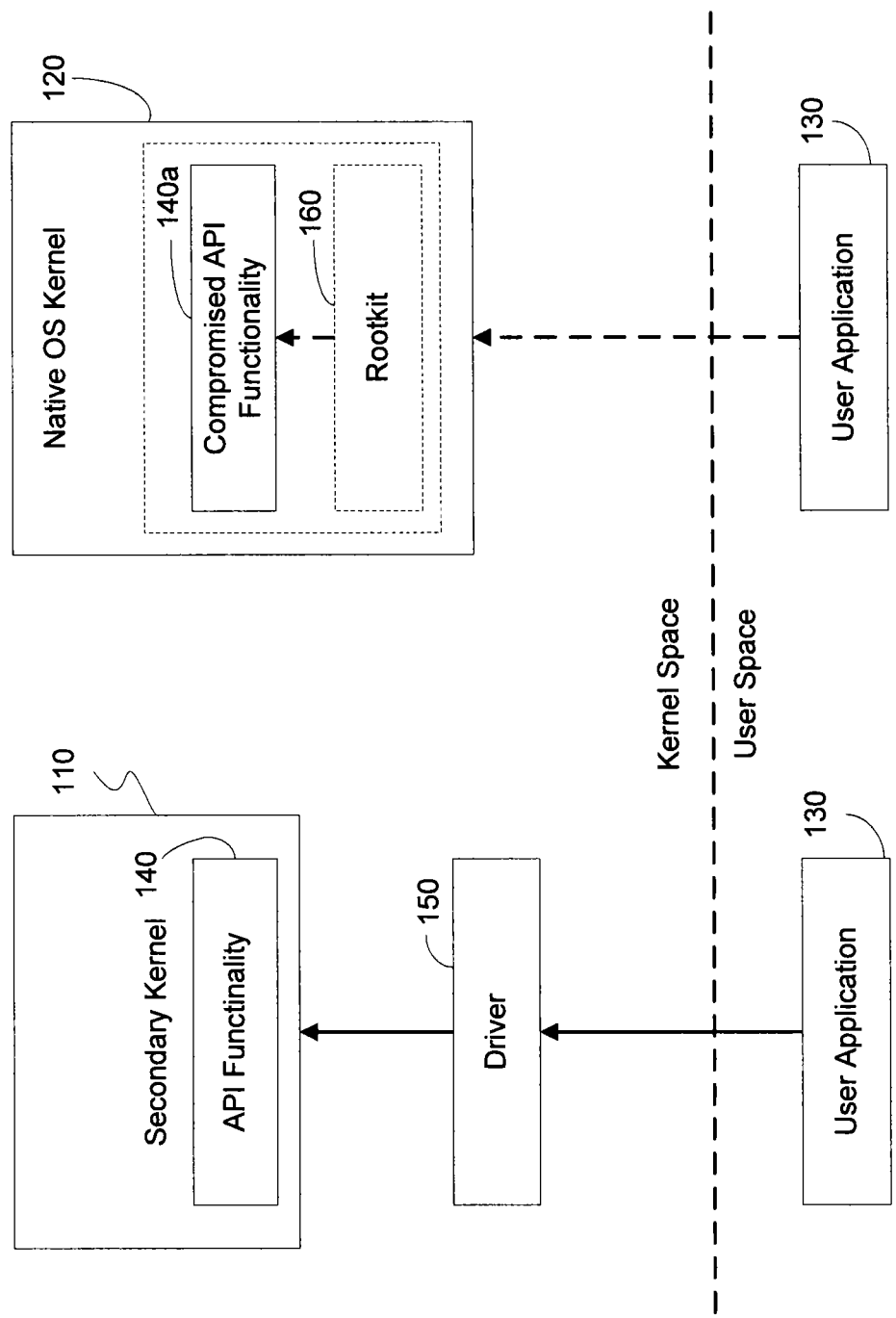
FIG. 1 is a flow diagram illustrating one embodiment of the invention, which may be used to detect hidden system objects by way of bypassing hooks that may be used by rootkits.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

One aspect of the invention is directed to detecting the presence of a rootkit in a computer system by detecting the fact that objects in the system have been hidden. The term "object" as used in this context refers to a file, a process, a driver, contents of a register, a system variable or its value, a system registry entry, a dynamic library item, a storage device or, generally, data or a resource of the computer system that is normally identifiable in the system but that may be surreptitiously or inadvertently hidden from detection by conventional means.

According to this aspect of the invention, detection of the fact that an object is hidden suggests that the computer system may have been compromised by a rootkit that has hidden that object.

According to one type of embodiment, detection of a hidden object is made possible by a second OS kernel that operates alongside the native, or original, OS kernel which facilitates and coordinates operation of system processes and user applications. The secondary kernel can perform most of the operations of the native kernel (and indeed, in some embodiments, could be configured to perform all of the operations of the native kernel). Examples of such functionality involves addressing/accessing one or more of the following system objects: files, drivers, processes, registry, memory-resident DLLs, and other computer system data or resources.

FIG. 1 is a flow diagram illustrating one embodiment, which may be used to detect hidden system objects by way of bypassing hooks that may be used by rootkits. As illustrated, applications 130, which execute on behalf of the user, gain accesses to a particular system object by sending one or more requests to the operating system kernel to actually obtain such access. However, native OS kernel 120, to which such requests are normally directed, may be corrupted by rootkit 160, which could interfere with the API functionality 140a. In this way, if a user application 130 attempts to request a list of files, for instance, then rootkit 160 could obfuscate the list by interfering with, and modifying the list of files being returned to the requesting application 130 through the rootkit's interception, or hooking, of the API functionality. Likewise, rootkit 160 may conceal files or registry entries, which it needs for its own functionality, thereby hiding its existence in the system.

However, using secondary kernel 110, with its unchanged API functionality 140, the rootkit's interference with the native system's APIs can be bypassed entirely. For this purpose, a special driver is used, secondary kernel access driver 150, which in one embodiment is configured as the only means for interfacing user application 130 with secondary kernel 110. This approach makes it possible to avoid the rootkit's hooks, and return to the requesting application data which contains objects that have been hidden by rootkit 160. Secondary kernel 110 can, in various implementations, have a 32-bit, 64-bit, or other suitable architecture. In one example embodiment, secondary kernel 110 is configured with an architecture that corresponds to the architecture of native OS kernel 120. In other embodiments, secondary kernel 110 can have an architecture that is distinct from that of native OS kernel 120.

In a related type of embodiment, access to the secondary kernel 110 is limited to certain threads, such as those which are generated by an antivirus engine. To this end, in this type of embodiment, system or application threads that are intended to access secondary kernel access driver 150 are specially equipped with that ability. In one example, those threads are generated with a capability to pass through an authentication phase enforced by secondary kernel access driver 150. In various embodiments, a variety of suitable authentication technique are employed including, but not limited to, cryptographic keys, digital signatures, digital credentials, and the like.

In one example, a thread capable of accessing secondary kernel 110 follows an authentication protocol to access secondary kernel 110 via secondary kernel access driver 150. In this example authentication protocol, a public key cryptosystem is utilized, where the authorized application has a private key and the secondary kernel access driver 150 has a public key of the authorized application. A thread of the authorized application requests a service from the secondary kernel 110 by sending a request message, of which at least a portion is encrypted with the authorized application's private key, to secondary kernel access driver 150. Secondary kernel access driver 150 uses the authorized application's public key to try to decrypt the encrypted portion of the request and, if it is able to complete the decryption successfully, then the request may be delivered to secondary kernel 110 for servicing. An unauthorized thread masquerading as a thread from an authorized application is presumed to lack the authorized application's private key and would therefore be unable to send requests that are decryptable by the authorized application's private key held by secondary kernel access driver 150.

In another example embodiment, a challenge-response approach is implemented also utilizing a public key cryptosystem. The protocol may begin as described in the previous example, that is, with a request being sent to secondary kernel access driver 150 by a thread which seeks access to secondary kernel 110. The request may or may not be at least partially encrypted as discussed above. In response to the request, secondary kernel access driver 150 generates a challenge to be fulfilled by the requesting process. The challenge requires the requesting process to decrypt a code or message (such as a randomly-generated number) using its private key. Accordingly, secondary kernel access driver 150 generates the challenge code or message, encrypts it with the authorized application's public key, and sends the encrypted challenge to the requesting process. The challenge code or message can be generated in response to the request, and can be different for each request, making previously-eavesdropped exchanges unusable in the future by malicious processes. In response to receiving the encrypted challenge code or message, the authorized application's process decrypts the code or message using its own private key, and returns the decrypted code or message to secondary kernel access driver 150. Prior to sending the decrypted code or message, the authorized process may encrypt the code or message with its private key, thereby requiring secondary kernel access driver 150 to decrypt it with the authorized application's public key. Such proof that the requesting process possesses the private key associated with an authorized application constitutes authentication of the requesting process according to this example.

As stated above, other authentication methods, either known, or arising in the future, may be utilized within the scope of the invention, unless expressly excluded in a particular claim.

Accordingly, in a given computer system having secondary kernel 110, there may be two classes of threads—those which are capable of accessing secondary kernel access driver 150, and those with are incapable of doing so. Those threads which are incapable of accessing secondary kernel access driver 150 operate using the native OS kernel 120, as would ordinarily occur in an un-protected system. Threads that are capable of accessing secondary kernel access driver 150 are redirected, by secondary kernel access driver 150, to secondary kernel 110.

Figure 2:
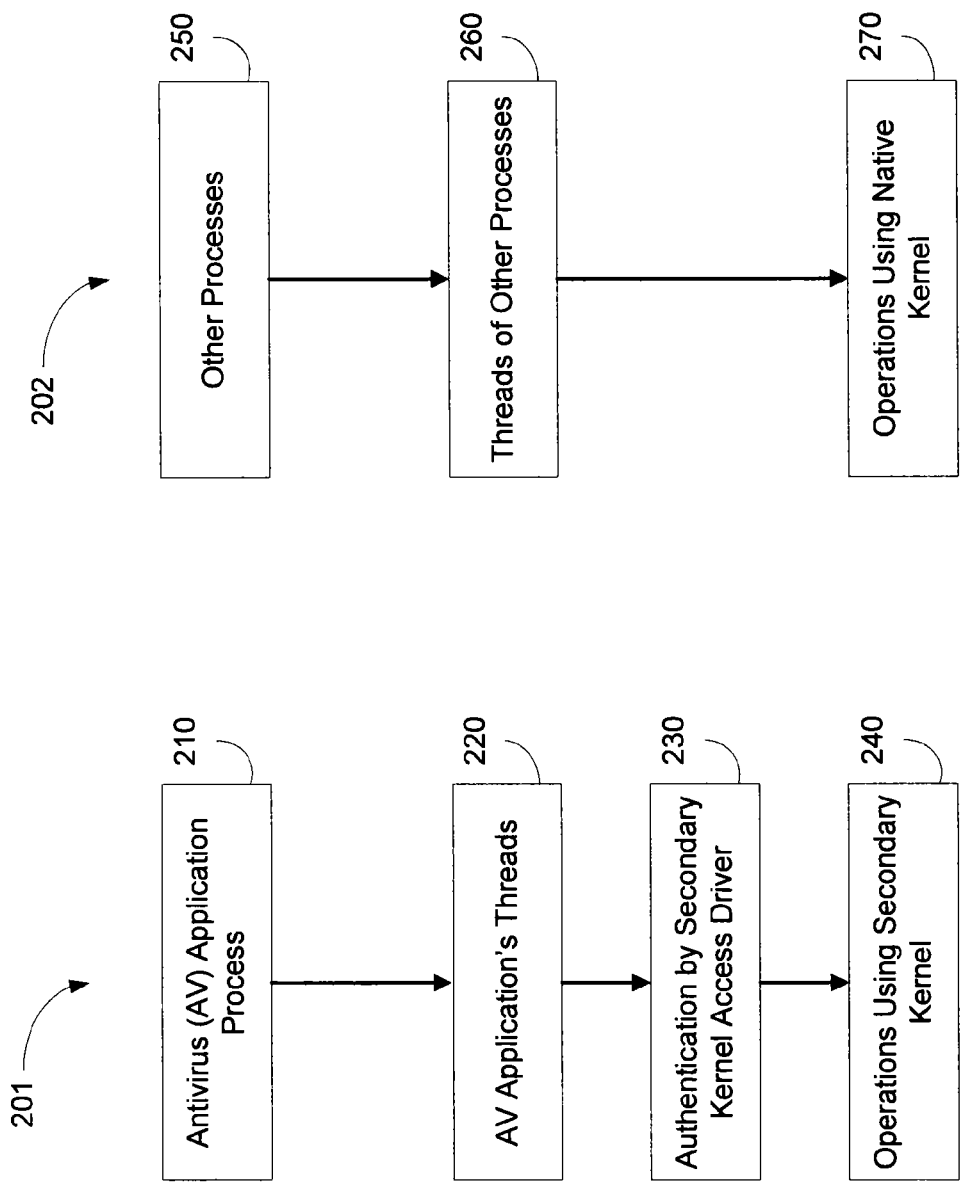
FIG. 2 illustrates separate sequences for accessing kernel operations by application programs in a computer system according to one embodiment.

FIG. 2 illustrates separate sequences 201 and 202 for accessing kernel operations by application programs in a computer system according to one embodiment. Sequence 201 enables an ability to detect hidden system objects according to one embodiment of the invention, while sequence 202 operates in conventional fashion. In sequence 201, antivirus (AV) application process 210 spawns AV application threads 220, which interface with secondary kernel access driver 150 to be authenticated, as indicated at block 230. Upon successful authentication, the AV application threads may access secondary kernel 110 to request operations at 240.

In sequence 202, other processes 250 spawn their own threads at 260, which interface only with native kernel 120 at 270, thereby avoiding any compromise in overall system performance associated with interfacing with secondary kernel 110.

Figure 3:
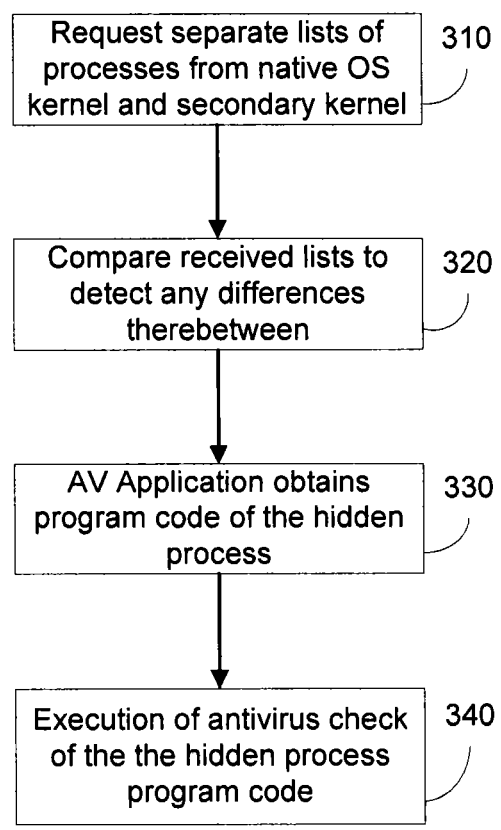
FIG. 3 illustrates an example process for recognizing a rootkit upon identifying hidden system objects according to one embodiment.

FIG. 3 illustrates an example process for recognizing a rootkit upon identifying hidden system objects according to one embodiment. At 310, one of the threads 220 of the AV application requests a list of processes using secondary kernel 110 and native OS kernel 120. In response to the requests, secondary kernel 110 and native OS kernel 120 each returns a list of processes. The AV application compares the two returned lists at 320. In this manner, the AV application can detect and analyze any differences between the lists. If, for example, secondary kernel 110 returns a more complete list of processes than does native kernel 120, then the AV application identifies a potential compromise of the API functionality 140*a* of native OS kernel 120 by rootkit 160.

In the case where secondary kernel 110 returns a list of processes containing more items than the list returned by native OS kernel 120, at block 330 the AV application obtains the program code of each of those hidden processes. For instance the AV application can request the file with which the hidden process is associated. At 340, the AV application checks the program code of each of the hidden process.

This type of approach advantageously enables a security arrangement for circumventing hooking techniques such as:

splicing of any kind (which may be to intercept any API function—essentially by replacing the first few bytes of the function of the instruction that transfers control to the interceptor code);

SSDT (System Service Descriptor Table) and Shadow SSDT hooks;

exploiting interrupts INT 2E for Windows 2000 (through the creation of interfaces for Zw-function (i.e. those functions which are called before execution of security checks such as user credentials, while functions having the prefix Nt-net) and MSR (Special Registers present in x86 processors, availability and designation of which varies from model to model of the processor);

any callbacks and alerts or notifications, none of which will work when those functions are called in secondary kernel 110.

Figure 4:
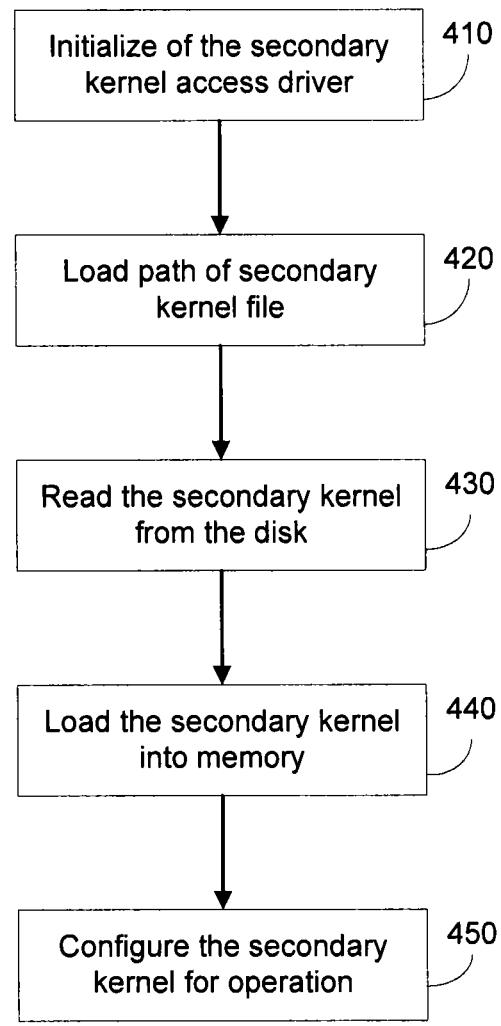
FIG. 4 illustrates an example process for initializing a secondary kernel and its associated components according to one embodiment of the invention.

FIG. 4 illustrates an exemplary process for initializing secondary kernel 110 and its associated components. At 410, the secondary kernel access driver is initialized. At 420, the path to the file having program instructions establishing secondary kernel 110 is loaded. In one embodiment, the path is read from undocumented variable KeLoaderBlock. That particular variable exists only for a short time during kernel initialization, so the initialization stage 410, in one approach, occurs as soon as possible. At 430, the secondary kernel is read from the disk following the loading of the path to the secondary kernel file. At 440, the secondary kernel is loaded into memory; paging is coordinated, global variables are made to point to the native OS kernel, and functions are imported, as necessary, into corresponding modules. Subsequently, at 450, secondary kernel 110 is configured as follows: its own SSDT table is created, necessary interfaces for functions are set up, and callbacks and notifications are removed.

In another embodiment, a technique is provided for detecting hidden objects at a low level in a computer system, where a rootkit may have been injected to override system drivers. This embodiment exemplifies aspects of the invention being applied not only to the kernel of the system, but also to the various system drivers, such as the system-supplied storage port drivers. For example, in the Windows operating systems there are two types of storage port drivers:

SCSI Port Driver (scsiport.sys), Storport Driver (storport.sys); and

ATA Port Driver (ataport.sys/atapi.sys).

Figure 5:
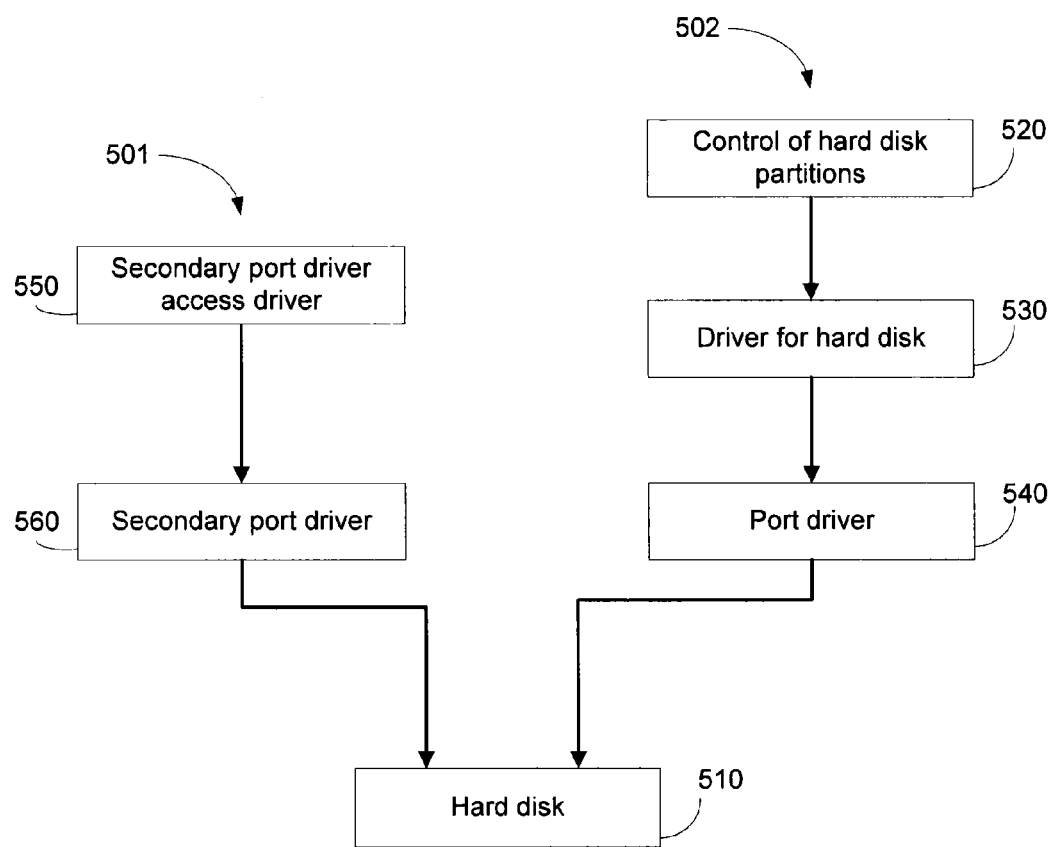
FIG. 5 illustrates two sequences for accessing a hard disk drive, including a secondary set of drivers according to one embodiment.

Referring to FIG. 5, two sequences are depicted for accessing a hard disk drive, sequence 501 utilizing a secondary set of drivers according to one embodiment for detecting system objects that may be hidden with corruption of system drivers, and conventional sequence 502. In the conventional case, rootkit hooks can be located either at the management level hard disk partitions 520 (e.g., partmgr.sys), the driver disk 530 (e.g., disk.sys), and even at the level of port driver 540 (e.g., atapi.sys). If it is not known in advance what level can be hooked by a rootkit, then it becomes impossible to detect.

Typically, system designers create port drivers based on system drivers that have been provided. The port driver is included in the driver stack of the system and provides additional functionality of the system. These port drivers facilitate a universal mechanism to access data on the physical medium through the unification of the access interface.

In the embodiment shown, secondary port driver 560 is initialized in the same manner as used to initialize the secondary kernel to access the extended functionality of hard disk 510. Use of secondary port driver 560 thus bypasses rootkit hooks, which would otherwise prohibit access to certain sectors of the disk or return a false representation of the content at the lowest level. Authentication via secondary port driver access driver 550 in this embodiment follows a similar protocol as discussed above with reference to secondary kernel access driver 150 in connection with FIG. 2.

Figure 6:
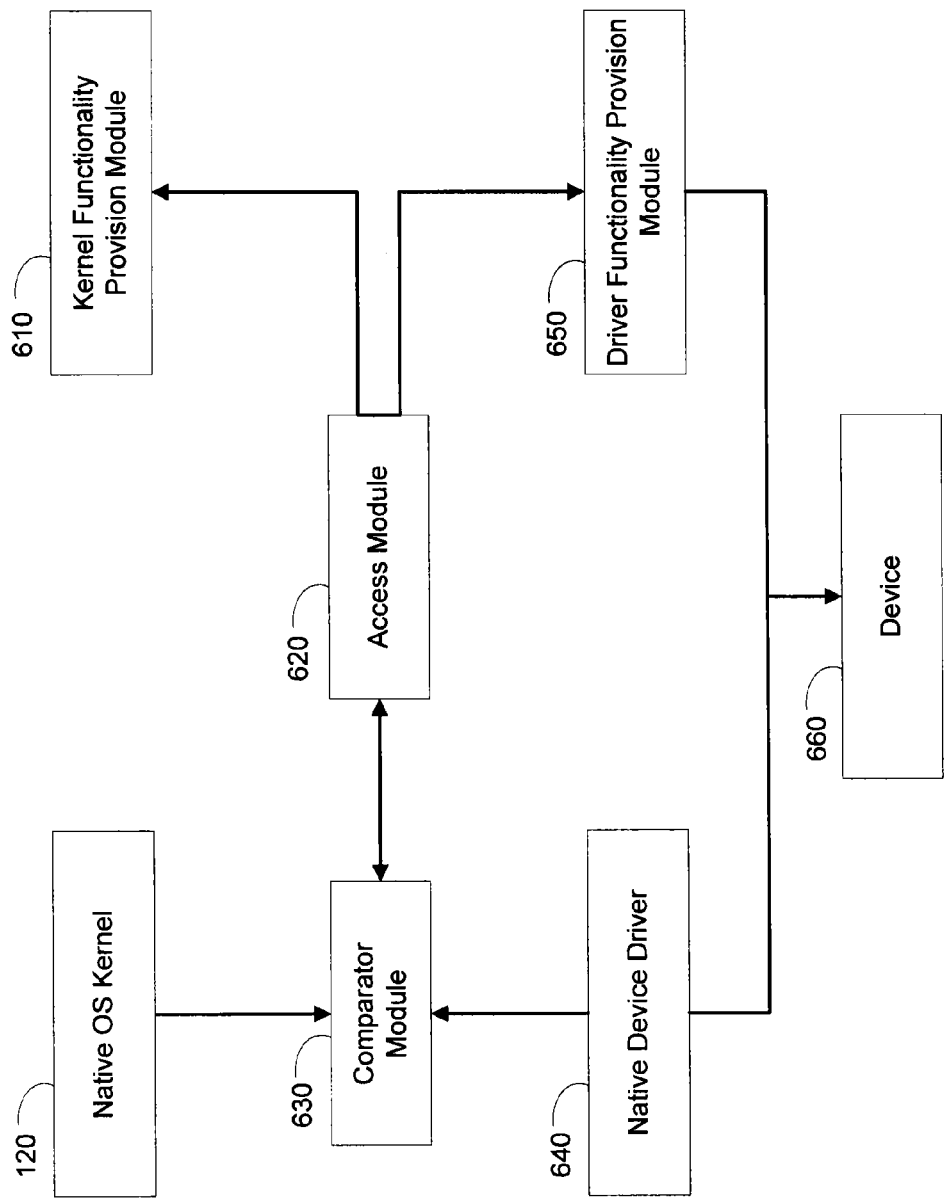
FIG. 6 is a block diagram illustrating a configuration of computer system modules according to one embodiment.

FIG. 6 is a block diagram illustrating a configuration of computer system modules according to one embodiment. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail below) that executes an operating system, system programs, and application programs, while also implementing the module using multitasking, multithreading, or other such techniques. Accordingly, each module can be realized in a variety of suitable configurations, and should not be limited to any particular implementation exemplified herein.

In the exemplary system depicted in FIG. 6, native OS kernel 120 processes requests from system or application processes (e.g., requesting a list of objects). Comparator module 630 obtains the results of certain requests, or of all such requests in some embodiments. Comparator module 630 is coupled to kernel functionality provision module 610 via access module 620. Access module 620 is responsible for authenticating comparator module 630 as a precondition for allowing access to kernel functionality provision module 610. Accordingly, other applications or devices in the system can be prevented from accessing kernel functionality provision module 610.

Kernel functionality provision module 610 implements some, or all, of the functionality of native OS kernel 120. In one embodiment, access module 620 is implemented via secondary kernel access driver 150 (as described above with reference to FIG. 1), and the kernel functionality provision module 610 is implemented via secondary kernel 150 (FIG. 1). In response to obtaining the results of a request serviced by native OS kernel 120 and the results of a corresponding request serviced by kernel functionality provision module 610, comparator module 630 analyzes the two sets of results and determines, based on any discrepancies between the result sets, whether there are any system objects that have been hidden.

In a related embodiment, comparator module 630 includes decision logic to further analyze the type, or the properties, of any discrepancies found between the two result sets to determine whether those discrepancies are indicative of a rootkit in the system.

In the exemplary system depicted in FIG. 6, native device driver 640 facilitates the interface with a hardware device 660, such as a hard disk drive, for example. Driver functionality provision module 650 also facilitates an interface with hardware device 660, except that the interface provided by driver functionality provision module 650 is secured by access module 620 in the same manner as kernel functionality provision module 610 is secured.

In response to obtaining the results of service requests made via native device driver 640 and driver functionality provision module 650, comparator module 630 compares the two sets of results and ascertains whether there are any discrepancies therebetween. In a related embodiment, comparator module 630 includes decision logic to further analyze the type, or the properties, of any discrepancies found between these two result sets to determine whether those discrepancies are indicative of a rootkit in the system.

Figure 7:
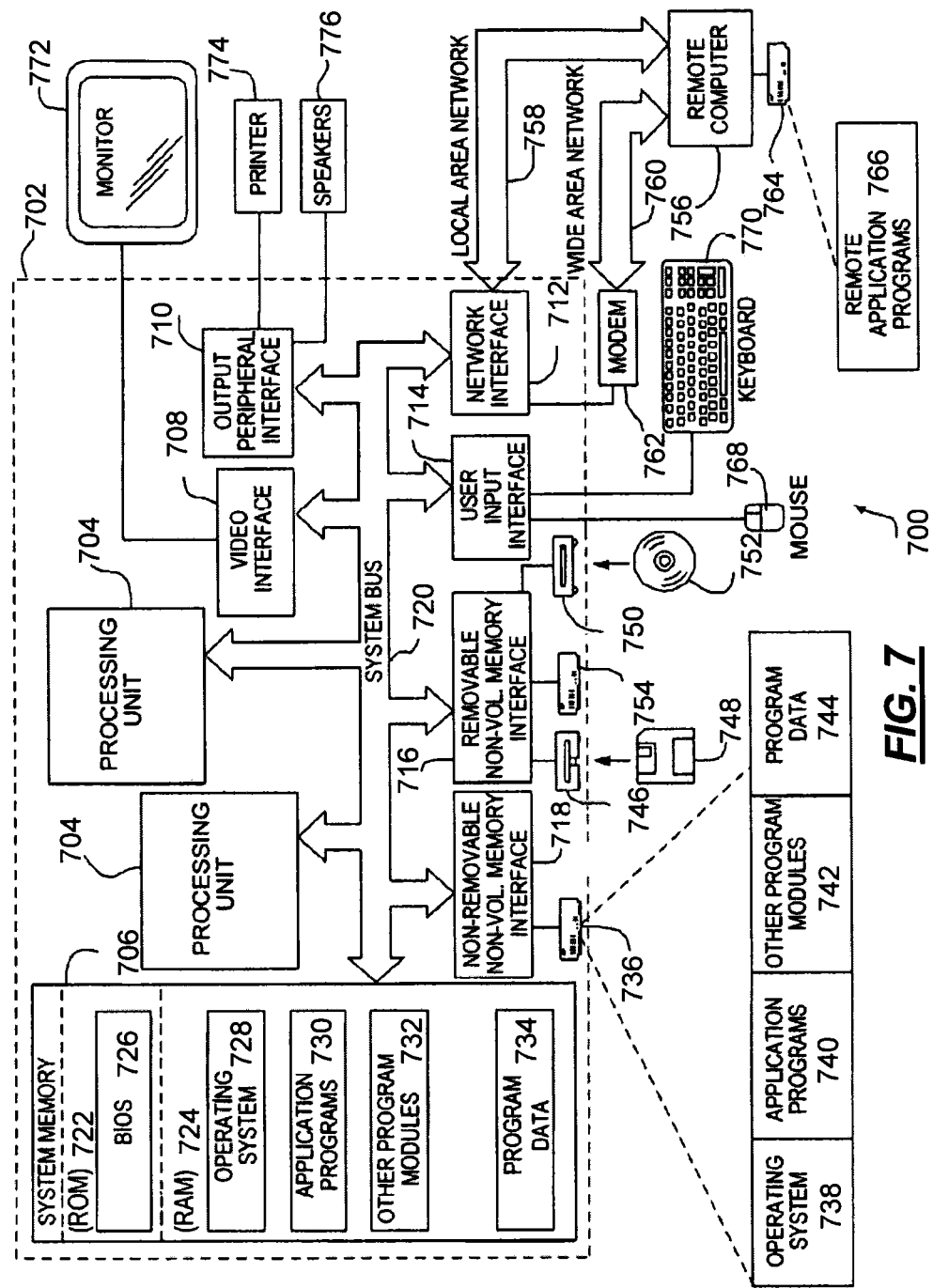
FIG. 7 is a diagram illustrating a computer system on which aspects of the invention may be implemented according to various embodiments.

FIG. 7 is a diagram illustrating in greater detail a computer system 700 on which aspects of the invention as described herein may be implemented according to various embodiments. The computer system 700 may include a computing device such as a personal computer 702. The personal computer 702 includes one or more processing units 704, a system memory 706, a video interface 708, an output peripheral interface 710, a network interface 712, a user input interface 714, removable 716 and non-removable 718 memory interfaces and a system bus or high-speed communications channel 720 coupling the various components. In various embodiments, the processing units 704 may have multiple logical cores that are able to process information stored on computer readable media such as the system memory 706 or memory attached to the removable 716 and non-removable 718 memory interfaces 718. The computer 702 system memory 706 may include non-volatile memory such as Read Only Memory (ROM) 722 or volatile memory such as Random Access Memory (RAM) 724. The ROM 722 may include a basic input/output system (BIOS) 726 to help communicate with the other portion of the computer 702. The RAM 724 may store portions of various software applications such as the operating system 728, application programs 730 and other program modules 732. Further, the RAM 724 may store other information such as program or application data 734. In various embodiments, the RAM 724 stores information that requires low-latencies and efficient access, such as programs and data being manipulated or operated on. In various embodiments RAM 724 comprises Double Data Rate (DDR) memory, Error Correcting memory (ECC) or other memory technologies with varying latencies and configurations such as RAMBUS or DDR2 and DDR3.

The removable 716 and non-removable 718 memory interfaces may couple the computer 702 to disk drives 736 such as solid-state drives (SSD) or rotational disk drives. These disk drives 736 may provide further storage for various software applications such as the operating system 738, application programs 740 and other program modules 742. Further, the disk drives 736 may store other information such as program or application data 744. In various embodiments, the disk drives 736 store information that doesn't require the same low-latencies as in other storage mediums. Further, the operating system 738, application program 740 data, program modules 742 and program or application data 744 may be the same information as that stored in the RAM 724 in various embodiments mentioned above or it may be different data potentially derivative of the RAM 724 stored data.

Further, the removable non-volatile memory interface 716 may couple the computer 702 to magnetic portable disk drives 746 that utilize magnetic media such as the floppy disk 748, Iomega® Zip or Jazz, or optical disk drives 750 that utilize optical media 752 for storage of computer readable media such as Blu-Ray®, DVD-R/RW, CD-R/RW and other similar formats. Still other embodiments utilize SSD or rotational disks housed in portable enclosures 754 to increase the capacity of removable memory.

The computer 702 may utilize the network interface 712 to communicate with one or more remote computers 756 over a local area network (LAN) 758 or a wide area network (WAN) 760. The network interface 712 may utilize a Network Interface Card (NIC) or other interface such as a modem 762 to enable communication. The modem 762 may enable communication over telephone lines, coaxial, fiber optic, powerline, or wirelessly. The remote computer 756 may contain a similar hardware and software configuration or may have a memory 764 that contains remote application programs 766 that may provide additional computer readable instructions to the computer 702. In various embodiments, the remote computer memory 764 can be utilized to store information such as identified file information that may be later downloaded to local system memory 706. Further, in various embodiments the remote computer 756 may be an application server, an administrative server, client computers, or a network appliance.

A user may enter information to the computer 702 using input devices connected to the user input interface 714 such as a mouse 768 and keyboard 770. Additionally, the input device may be a trackpad, fingerprint scanner, joystick, barcode scanner, media scanner or the like. The video interface 708 may provide visual information to a display such as a monitor 772. The video interface 708 may be an embedded interface or it may be a discrete interface. Further, the computer may utilize a plurality of video interfaces 708, network interfaces 712 and removable 716 and non-removable 718 interfaces in order to increase the flexibility in operation of the computer 702. Further, various embodiments utilize several monitors 772 and several video interfaces 708 to vary the performance and capabilities of the computer 702. Other computer interfaces may be included in computer 702 such as the output peripheral interface 710. This interface may be coupled to a printer 774 or speakers 776 or other peripherals to provide additional functionality to the computer 702.

Various alternative configurations and implementations of the computer 702 are within the spirit of the invention. These variations may include, without limitation, additional interfaces coupled to the system bus 720 such as universal serial bus (USB), printer port, game port, PCI bus, PCI Express or integrations of the various components described above into chipset components such as the northbridge or southbridge. For example, in various embodiments, the processing unit 704 may include an embedded memory controller (not shown) to enable more efficient transfer of data from the system memory 706 than the system bus 720 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer system for detecting hidden objects, the system comprising:
   computer circuitry having at least a processor coupled to a memory arrangement, the computer circuitry being configured to execute at least an operating system and a security arrangement;
   wherein the operating system is adapted to facilitate execution of a plurality of processes and provide at least one native service module that returns a first set of requested information relating to at least one object in the computer system in response to a request made by at least one of the plurality of processes; and
   wherein the security arrangement includes:
      a secondary service module that is adapted to generate and return a second set of requested information relating to the at least one object in the computer system in response to a request made by at least one authorized process of the plurality of processes, wherein in generating the second set of requested information, the secondary service module bypasses the at least one native service module;
      an access limiting module that limits access to the secondary service module such that only the at least one authorized process is permitted to access the secondary service module, wherein the access limiting module is adapted authorize the at least one authorized process based on cryptography and to thereafter direct the at least one authorized process to access the secondary service module, and such that non-authorized processes are not permitted to access the secondary service module; and
      a comparison module adapted to compare the first set of requested information and the second set of requested information to produce a comparison and, based on the comparison, determines whether any object is present in the second set of requested information that is absent from the first set of requested information, and to analyze properties of any such object to determine whether an absence of that object from the first set is indicative of a presence of a rootkit in the computer system.

2. The computer system of claim 1, wherein the at least one native service module comprises at least a portion of a kernel of the operating system.

3. The computer system of claim 1, wherein the at least one native service module comprises at least a portion of a kernel of the operating system and at least one driver, and wherein the security arrangement includes a first type of secondary service module that performs at least some functionality of said at least portion of the kernel of the operating system and a second type of secondary service module that performs at least some functionality of the at least one driver.

4. The computer system of claim 1, wherein the at least one native service module comprises at least a portion of a device driver.

5. The computer system of claim 1, wherein the secondary service module includes substantially all functionality of the native service module.

6. The computer system of claim 1, wherein the secondary service module has an architecture that differs from the native service module.

7. The computer system of claim 1, wherein the at least one object is selected from the group consisting of: at least one file, at least one driver, at least one process, at least one register, at least one registry entry, at least one dynamic library, at least one storage device, or any combination thereof.

8. The computer system of claim 1, wherein the access limiting module is adapted to apply an authentication check of each process requesting access to the secondary service module, to permit only those processes that are able to pass the authentication check to access the secondary service module.

9. The computer system of claim 1, wherein the access limiting module is adapted to permit only a predetermined at least one process that is associated with the comparison module to access the secondary service module.

10. The computer system of claim 1, wherein the security arrangement further comprises a security application that runs in a user space and, when executed, generates specific security threads in the operating system; and
wherein in the security arrangement, the specific security threads are routed to the secondary service module.

11. In a computer system having at least a processor coupled to a memory arrangement and configured to execute at least an operating system and a security arrangement, a method for detecting a security compromise of a service module of the operating system, the method comprising:
providing, via the operating system, at least one native service module that returns a first set of requested information relating to at least one object in the computer system in response to a request made by at least one thread;
providing, via the security arrangement, a secondary service module that is adapted to generate and return a second set of requested information relating to the at least one object in the computer system in response to a request made by at least one authorized thread, wherein in generating the second set of requested information, the secondary service module bypasses the at least one native service module;
limiting access of threads to the secondary service module such that only predetermined threads generated by a trusted security application are permitted to access the secondary service module, wherein the predetermined threads are authorized based on cryptography and are thereafter directed to access the secondary service module, and such that all other threads are not permitted to access the secondary service module;
comparing the first set of requested information and the second set of requested information to produce a comparison;
based on the comparison, determining whether any object is present in the second set of requested information that is absent from the first set of requested information, thereby identifying at least one hidden object, and analyzing properties of any such hidden object to determine whether an absence of that object from the first set is indicative of a presence of a rootkit in the computer system.

12. The method of claim 11, wherein providing the at least one native service module includes providing a portion of a kernel of the operating system.

13. The method of claim 11, wherein providing the at least one native service module includes providing at least a portion of a kernel of the operating system and at least one driver;
providing, in the security arrangement, a first type of secondary service module that performs at least some functionality of said at least portion of the kernel of the operating system; and
providing, in the security arrangement, a second type of secondary service module that performs at least some functionality of the at least one driver.

14. The method of claim 11, wherein providing the at least one native service module includes providing a device driver.

15. The method of claim 11, wherein providing the secondary service module includes providing substantially all functionality of the native service module.

16. The method of claim 11, wherein providing the secondary service module includes providing an architecture that differs from that of the native service module.

17. The method of claim 11, wherein the at least one object is selected from the group consisting of: at least one file, at least one driver, at least one process, at least one thread, at least one register, at least one registry entry, at least one dynamic library, at least one storage device, or any combination thereof.

18. The method of claim 11, wherein limiting access of threads to the secondary service module includes applying an authentication check of each thread requesting access to the secondary service module, to permit only those threads that are able to pass the authentication check to access the secondary service module.

19. An improved computer system having at least a processor coupled to a memory arrangement and configured to execute at least an operating system and a security arrangement, wherein the operating system provides at least one native service module that returns a first set of requested information relating to at least one object in the computer system in response to a request made by at least one thread, the improvement comprising:
means for generating and returning a second set of requested information relating to the at least one object in the computer system in response to a request made by at least one authorized thread, wherein in generating the second set of requested information, the means for generating and returning bypass the at least one native service module;
means for limiting access of threads to the means for generating and returning the second set of requested information such that only predetermined threads generated by a trusted security application are permitted to access those means, wherein the predetermined threads are authorized based on cryptography and are thereafter directed to access the means for generating and returning the second set of requested information, and such that all other threads are not permitted to access the means for generating and returning the second set of requested information;

means for comparing the first set of requested information and the second set of requested information to produce a comparison; and means for determining, based on the comparison, whether any object is present in the second set of requested information that is absent from the first set of requested information, and to analyze properties of any such object to determine whether an absence of that object from the first set is indicative of a presence of a rootkit in the computer system.

* * * * *